United States Patent [19]

Eshnaur et al.

[11] 4,130,092

[45] Dec. 19, 1978

[54] DUST BAG FOR ANIMAL INSECTICIDE

[76] Inventors: W. Scott Eshnaur; Helen E. Eshnaur, both of 3207 Coronado, St. Joseph, Mo. 64505

[21] Appl. No.: 845,629

[22] Filed: Oct. 26, 1977

Related U.S. Application Data

[62] Division of Ser. No. 701,794, Jul. 1, 1976, Pat. No. 4,079,700.

[51] Int. Cl.$^2$ .................. A01K 13/00; A01K 29/00
[52] U.S. Cl. ................................................. 119/159
[58] Field of Search ............. 119/159; 150/3, 7, 12; 229/DIG. 14

[56] References Cited

U.S. PATENT DOCUMENTS

| | | | |
|---|---|---|---|
| 3,364,900 | 1/1968 | Knapp | 119/159 |
| 3,821,940 | 7/1974 | Mann | 119/159 |
| 3,902,461 | 9/1975 | Cortner, Jr. | 119/159 |
| 3,972,309 | 8/1976 | Cortner, Jr. | 119/159 |

FOREIGN PATENT DOCUMENTS 550072  10/1956  Belgium ........................ 229/DIG. 14

*Primary Examiner*—Hugh R. Chamblee

*Attorney, Agent, or Firm*—Lowe, Kokjer, Kircher, Wharton & Bowman

[57] ABSTRACT

A dust bag for applying powder insecticide to animals includes an outer mesh bag, an inner mesh bag, a waterproof lining between the two bags, and a double bag cartridge for containing the insecticide. The inner bag is placed inside of the outer bag with a dust chamber presented between the bottom ends of the bags to receive powder passing through the inner bag. The inner bag is characterized by a closer mesh weave than the outer bag, and the two woven bags cooperate with the waterproof lining to prevent rainwater from contaminating the powder while metering the flow of the insecticide to the animals. The cartridge is supported on the bottom of the inner bag and comprises a double bag arrangement with offset holes in the two bags for preventing water entry. The invention also contemplates a novel closure structure for a bag wherein a U-shaped hanger is coupled with a flap which closes an opening in the bag. An arm projects from each end of the U-shaped hanger and flexible cable means is wrapped around the arm to cause a moment which forces the flap into its closed position. An alternative load opening and closure comprises a slit through the bag oriented approximately 20° from vertical and a similarly angled waterproof strip having velcro fasteners for closing the slot.

9 Claims, 7 Drawing Figures

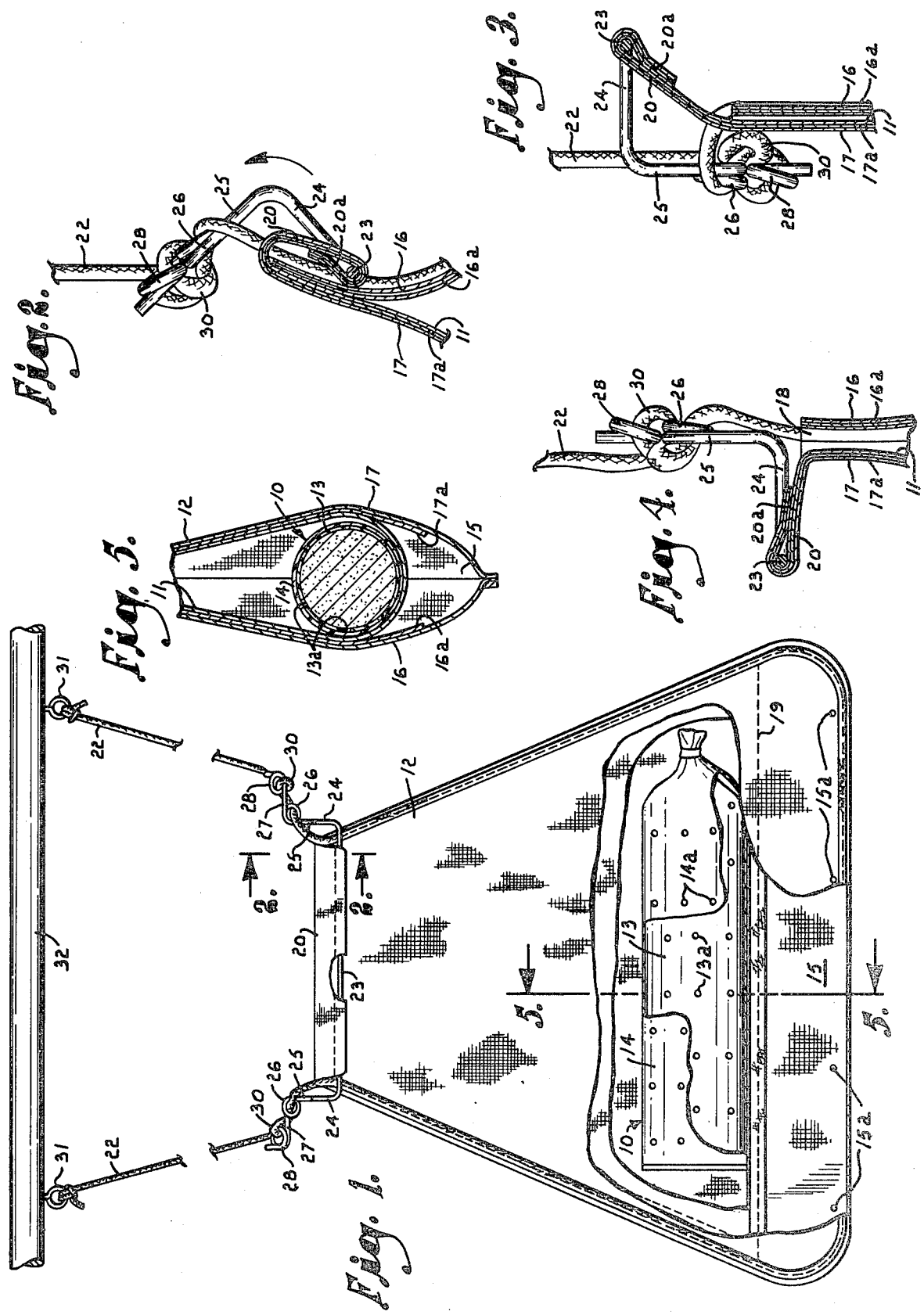

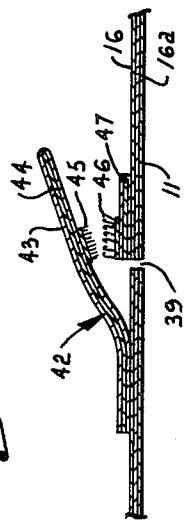
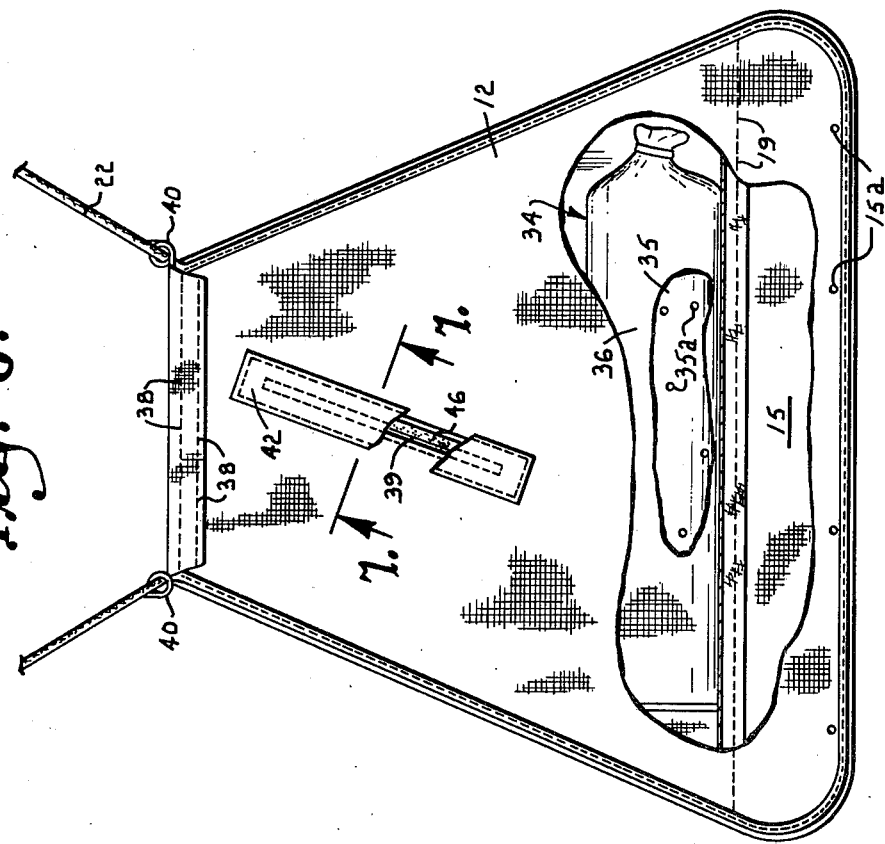

DUST BAG FOR ANIMAL INSECTICIDE

This is a division of application Ser. No. 701,794, filed July 1, 1976, now U.S. Pat. No. 4,079,700.

BACKGROUND AND SUMMARY OF THE INVENTION

This invention relates generally to containers for applying insecticide to animals and more particularly to a dust bag construction and a novel closure structure.

In recent years it has been found that the treatment of cattle with powder insecticides has considerable advantages over the oil base insecticides that have been widely used in the past. Powder may be applied more effectively and efficiently to the entire body of the animal and is also more economical than oil base insecticide. In addition, the dust bags that are used to apply the dust to the animals require much less space than the "oilers" that are used to apply liquid insecticide.

Various types of dust bags have been developed to hold the powder insecticide and to apply it to cattle. However, these dust bags have not been wholly satisfactory in a number of respects. A major problem in the past has been to effectively waterproof the dust bag without interfering with the powder flow. Existing dust bags typically include an outer canvas bag for waterproofing and an inner burlap bag which contains the powder. This type of bag is unable to accurately meter the flow of powder, particularly when holes develop in the outer canvas bag through wear. This problem is further compounded because of the tendency of cattle to chew on canvas and thus expose the inadequately shielded inner bag through the resulting tears and holes. This type of construction, with a loose-weave inner bag, also permits powder to become trapped between the inner and outer bags where it will become wet and cake. Existing dust bags often present substantially solid surfaces against which the wind acts to whip the bag about and shake out the powder. An additional problem with existing dust bags is that when moisture does get into the bag, there is insufficient air access to permit the moisture to dry up. A further problem is that conventional dust bags rely on the thickness of the bag material for metering of the powder flow, and this has proven to be unreliable, particularly after the bag becomes worn.

Conventional dust bags load from the side and require complicated closure devices which are difficult and time consuming to manipulate during loading and unloading. These complex closures also increase the cost of the dust bag to a significant extent and are susceptible to inadvertently opening under the influence of animals, the weight of the dust bag contents, or adverse weather. The load opening and its closure are typically oriented vertically to minimize the susceptibility to opening unintentionally due to the weight of the insecticide. However, this gives rise to an additional problem because water is able to leak particularly easily thru a vertical opening. Thus, the closures must be waterproof seals to counteract the tendency to leakage, and further increases in the cost and complexity result.

It is an important object of the present invention to provide a dust bag for applying powder insecticide to animals which is constructed to accurately meter the flow of the powder, even after prolonged use.

It is another object of the invention to provide a dust bag which is improved in its water resistant properties as compared to existing dust bags. The double mesh bag construction is important in this regard, as is the double wall cartridge with offset metering holes in which the insecticide is contained.

Still another object of the invention is to provide a dust bag of the character described which provides air access to its interior in order to quickly dry up any moisture that does manage to enter the bag.

A further object of the invention is to provide a dust bag of the character described which is constructed so as not to be unduly whipped about by the wind.

An additional object of the invention is to provide a dust bag of the character described which includes a waterproof lining between the two mesh bags. The lining prevents moisture entry into the sides or top and thus cooperates with the overall construction in weatherproofing the bag without interfering with the powder flow.

A still further object of the invention is to provide a dust bag of the character described which presents a dust chamber from which the powder is actually applied to the animals. The amount of powder entering the dust chamber is accurately metered so as not to be supplied excessively and possibly cake, and the powder in the chamber is able to easily flow out through the relatively large mesh openings of the single ply outer bag. In addition, larger holes are formed in the wall of the dust chamber to release any excessive or caked insecticide.

Yet another object of the invention is to provide a dust bag which is adapted for loading at the top and which has a closure that remains fully closed during use while being easily opened for loading or unloading.

Another object of the invention is to provide a dust bag in which the rate of dust flow may be varied in accordance with the concentration of the insecticide and the conditions under which the bag is used. By varying the size and number of the metering holes in the inner cartridge which contains the powder, the flow rate may be set relatively high for range or pasture use and relatively low for confinement situations, thereby providing sufficient but not excessive powder for each use to which the dust bag is put.

A still further object of the invention is to provide a dust bag of the character described which includes a hanger assembly that acts to support the bag and to firmly bias the bag closure to remain in its closed position during use.

Still another object of the invention is to provide a dust bag which has a load opening and a simple yet effective closure. The orientation of the alternative opening and closure at an angle from vertical is important in this respect since it effectively counteracts the tendency of the bag to open by its own weight while assuring that water will run off of the closure along its inclined edges so that the closure itself need not be a waterproof seal.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is an elevational view of a dust bag constructed in accordance with a first embodiment of the present invention, with portions of the various bags broken away for clarity;

FIG. 2 is a fragmentary enlarged view taken generally along line 2—2 of FIG. 1 in the direction of the arrows and showing the hanger and closure flap in the closed position;

FIG. 3 is a fragmentary view similar to FIG. 2, but showing the hanger and closure flap moved to a position between the open and closed positions;

FIG. 4 is a fragmentary view similar to FIGS. 2 and 3 but showing the hanger and closure in the open position;

FIG. 5 is a fragmentary cross sectional view taken generally along line 5—5 of FIG. 1 in the direction of the arrows;

FIG. 6 is a front elevational view of a dust bag constructed in accordance with a second embodiment of the invention, with portions of the various bags broken away for illustrative purposes; and FIG. 7 is a cross sectional view on an enlarged scale taken generally along line 7—7 of FIG. 6 in the direction of the arrows.

Referring initially to FIG. 1, the dust bag of the present invention comprises a multiple bag arrangement which includes an inner cartridge bag assembly 10, an intermediate bag 11, and an outer bag 12. Powder insecticide is contained within the inner bag assembly 10 which may be a multi-walled bag or a pair of separable bags 13 and 14 that are arranged one inside the other, as shown in FIG. 1.

Each bag 13 and 14 is substantially equal in size and each is constructed of a sturdy flexible material, preferably a strong, thin plastic. It has been found that polyethylene or polyvinyl chloride is a highly desirable material for constructing the cartridge bags, primarily because of the strength, flexibility, and economy of these materials. It has further been found that thin film bags having a thickness between 5.5 and 6.0 mils are strong enough to hold the powder and are readily able to collapse as the powder flows out of the bags. Bags 13 and 14 are preferably black or another dark shade so as to resist ultraviolet light and shield the powder insecticide therefrom.

Each bag 13 and 14 is punched with a series of punctures 13a and 14a, respectively, with the punctures 13a in the inside bag 13 being offset from those in the outside bag 14. The number, size, and spacing of punctures 13a and 14a may be varied throughout a considerable range, depending upon the flow rate of powder that is desired. It has been found that between twelve and fifteen punctures approximately 1/16 inch in size and spaced relatively evenly on each bag allows sufficient powder flow for the typical situation. Twenty-four to 30 punctures of the same size results in a considerably increased flow rate in circumstances where a large number of animals are to be dusted. Bags 13 and 14 are preferably sealed or tied together to close off the ends thereof that are initially open for receiving the powder insecticide. An outer shipping bag (not shown) which is imperforate is preferably fit over the outer bag 14 during shipping in order to prevent powder leakage and shipping damage.

The inner bag assembly 10 is supported on the bottom of the much larger intermediate bag 11, as best shown in FIG. 5. The fit of bag assembly 10 in bag 11 is rather tight, although there is sufficient room between the bags for powder to build up in quantities up to 4 or 5 ounces. Bag 11 is a mesh bag preferably woven from polyester or some other synthetic threads of approximately 10 mil diameter. The threads are woven to provide mesh openings in the bag, and it has been found that a mesh opening count in the range of approximately 50 × 30 per square inch achieves particularly good results, although the size of the mesh openings may be varied considerably without affecting the desirable properties of the bag. The intermediate bag 11 has a top opening for loading and unloading the inner bag assembly 10, and this opening coincides with the load opening in the outer bag 12 which will be described in more detail.

The outer bag 12 contains both the inner and intermediate bags and is thus larger than either. As best shown in FIG. 5, the bottom end of bag 11 is spaced above the bottom of bag 12 so that a substantially enclosed dust chamber 15 is formed at the bottom of bag 12 and below bag 11. As shown in FIG. 1, a plurality of release openings 15a are formed through the lower portion of bag 12 to provide outlets from chamber 15 for wet powder. Bag 12 is a mesh bag woven from polyester or some other synthetic threads. The mesh of bag 12 is not as fine as that of bag 11; i.e., the mesh openings of bag 12 are larger than those of bag 11. Good results have been obtained with a mesh count in the range of approximately 24 × 34 per square inch for bag 12, although again the size of the mesh openings in the outer bag is subject to considerable variation.

Bag 12 includes substantially flat front and rear panels 16 and 17 to which relatively heavy canvas panels 16a and 17a (FIG. 5) are secured on the inside of the outer bag. The canvas panels 16a and 17a are provided for the purposes of preventing water from entering bag 11 and are thus located between bags 11 and 12. The lower edges of panels 16a and 17a are located slightly below the bottom of bag 11 but well above the bottom of bag 12 so that powder is able to pass out of chamber 15 through the mesh openings of bag 12. Bags 11 and 12 and the canvas panels 16a and 17a are preferably black or another dark shade in order to shield the insecticide from ultraviolet light.

The side edges of bag 12 taper inwardly toward one another as they approach the top of the bag. Panels 16 and 17 of the outer bag are stitched together along their side and bottom edges but are separate at their top edges in order to present an opening 18 (FIG. 4) in the top of the bag for loading and unloading of the inner cartridge bag assembly 10. Bag 11 is secured to bag 12 at the side and top edges so that opening 18 extends into bag 11 also. When bag 12 is empty, it may be collapsed in flat form with panels 16 and 17 lying against one another. At their lower edges, panels 16a and 17a are secured to panels 16 and 17 along stitch lines 19 (FIG. 1). The rear panel 17 extends above the front panel 16 in order to provide a flap 20 which serves as a closure for opening 18. Flap 20 may be turned downwardly over the top edge of panel 16 and against the front surface thereof to close opening 18 (FIG. 2) and may be opened by raising it and turning it to the rear of panel 17 (FIG. 4).

A flexible rope 22 is used in cooperation with a hanger to suspend the outer bag 12 from a support, and also to bias the closure flap 20 to remain closed during use. The hanger is constructed from a single piece of wire and includes a horizontal rod 23 which extends along the terminal edge of flap 20. The edge of flap 20 is overlapped at 20a and stitched in its overlapped condition to form a loop area in which rod 23 is received. At each end, rod 23 is turned at approximately 90° to form a pair of straight leg portions 24 which are located outwardly of the lateral edges of flap 20. Manifestly, rod 23 and leg portions 24 cooperate to present a substantially U-shaped member. Each leg portion 24 is bent at substantially 90° at the opposite end to form straight arms 25 that are generally perpendicular to leg portions 24 and also to rod 23. The opposite end of each arm 25 is coiled to form a first circular loop 26. A connecting portion 27 (FIG. 1) extends generally outwardly from each loop 26, and a second circular loop 28 is formed on the end of each portion 27 at a location outwardly of and slightly above the first loop 26.

The rope 22 is preferably woven from a plurality of strands of plastic fiber in order to enhance its strength. As shown in FIG. 1, the rope extends along the side and bottom edges of the front panel 16 and is securely stitched to panels 16 and 17, to the side edges of the canvas panels 16a and 17a, and to the side edges of bag 11 in order to protect the edges of the dust bag against wear and to distribute the hanging load relatively uniformly over the entire bag. the ends of rope 22 that extend above the bag are passed over arms 25 and inserted through the first loops 26 and are then threaded through the second loops 28 knotted thereto at 30. The rope ends extend well above knot 30 and may be tied to eye bolts 31 which are attached to a support 32. The support may be the top member of a gate through which animals pass, or it may be any other support member that is suitable for hanging of the dust bag.

In use, the cartridge bag assembly 10 is loaded into the intermediate bag 11 which is in turn located within bag 12. The multiple bag arrangement is then suspended from the support 32 as shown in FIG. 1. This manner of suspension of the dust bag provides a two point attachment which prevents the bag from turning due to wind or the like. Alternatively, the free ends of rope 22 may be brought together and tied to a single point of attachment centered above the dust bag. The latter manner of suspension permits the bag to turn about the attachment point under the influence of wind or agitation from the animals.

In either case, the hanger acts to firmly retain flap 20 in its closed position. The main bearing areas of rope 22 are on the second loops 28 since the rope is knotted on these loops, although the load is also distributed elsewhere on the hanger and on the outer bag 12 due to the stitching of the rope to the bag edges. The force of rope 22 on arms 25 creates a moment which continuously urges the hanger toward an orientation wherein its center of gravity is located directly below its main point of attachment to the rope (loops 28). Due to the inclined orientation of arms 25 when in the position of FIG. 2, the force of the rope tends to push the lower end of each arm 25 to the left which in turn pushes each of the leg portions 24 downwardly and to the left. This moment force on leg portions 24 is transmitted to rod 23 which acts along its entire length to push the edge of flap 20 against the forward surface of panel 16. Accordingly, flap 20 is firmly biased to remain closed in the position of FIG. 2.

To open flap 20 for loading and unloading through opening 18, the edge of the flap is grasped and swung upwardly as indicated by the directional arrow in FIG. 2. As this occurs, rod 23 rotates within the containing loop area of the flap, and legs 24 and arms 25 pivot counterclockwise from the position shown in FIG. 2 toward the position shown in FIG. 3. Once the position of FIG. 3 is reached, leg portions 24 extend horizontally to the rear of rod 23 and arms 25 extend straight downwardly from leg portions 24. Further rearward movement of the flap causes arms 25 to become inclined from vertical with the end adjacent loop 26 located forwardly of the opposite end of the arm. Since rope 22 continues to exert an upward force on the loop end of each arm 25, these ends of the arms are pulled upwardly until they are located above the other arms ends, and each arm 25 thereby moves to the vertical orientation shown in FIG. 4. The movement of arms 25 carries leg portions 24 and rod 23 to the rear and thus opens flap 20 to expose opening 18 for loading and unloading. Arms 25 resist any tendency to be inclined from vertical so that the hanger assembly biases the flap to remain open. The opening may be closed by simply swinging flap 20 forwardly past the position shown in FIG. 3. It will be appreciated that the foregoing described closure structure will find application for types of containers, particularly of the bag variety, other than cattle dust bags. Whenever a bag or flap-container is to be suspended from an overhead position, the closure structure of the present invention may be utilized.

When animals brush against or otherwise agitate the outer bag 12, the internal pressure created within the cartridge bags 13 and 14 causes the powder insecticide to be pushed through the punctures 13a of bag 13 and then through the punctures 14a of bag 14, with the offset locations of punctures 13a and 14a providing effective metering of the powder flow. Most of the powder passes on downwardly through the mesh openings of bag 11 and into the dust chamber 15. From chamber 15, the powder flows through the outer bag 12 through its relatively large mesh openings. When one animal brushes bag 12, enough powder is usually shaken out of the dust bag to effectively dust five or six animals in the surrounding area.

A small amount of powder (2 or 3 ounces) builds up in chamber 15, and a greater amount (approximately 4 or 5 ounces) builds up in bag 11 outside of cartridge bag 10. Since the mesh openings in bag 11 are smaller than those of bag 12, the powder that passes through bag 11 into chamber 15 passes more easily through the larger mesh openings of bag 12. Even when large holes are worn through bag 12, the dust bag will continue to function effectively since the powder is still metered as it passes through the small mesh openings of bag 11. During rainfall, the canvas panels 16a and 17a prevent water from getting into bag 11. The mesh openings of bag 12 break up and repel the moisture contacting the lower portion of the dust bag, and only a small amount of moisture is able to enter chamber 15 through the outer bag and even then only in a fine mist form. Since there is only a small build up of powder in chamber 15, the moisture that is able to enter the chamber under extreme conditions does not cause much caking of the powder and even then, only the loose powder in chamber 15 is caked. The powder that does become caked is able to pass out of chamber 15 through the large release holes 15a and is thus able to contact the animals and penetrate their heavy hair coat for effective treatment of lice.

During extremely heavy rainfall and under other extreme weather conditions, a small amount of moisture or damp powder will pass upwardly into bag 11 from chamber 15, although the small mesh openings of bag 11 prevent this from occurring to a large extent. The moisture that is able to reach the small amount of powder that may build up in bag 11 is absorbed, but even then the rapid air circulation provided by the mesh openings in bags 11 and 12 quickly dries up the moisture so that efficient powder flow through the bags is restored in a short time when the bag is butted by cattle. Bags 13 and 14 provide ultimate moisture protection for the powder, and their offset punctures 13a and 14a effectively resist moisture entry. Thus, even though the arrangement of mesh bags for a dust bag according to the present invention is directly contrary to prior art devices which required a small mesh outer bag for waterproofing qualities and a larger inner mesh bag for metering the flow of the powder insecticide, the arrangement of the present invention has been found highly superior in preventing moisture entry which will damage the powder.

The passage of powder from cartridge bag 10 to the animals is accurately and effectively metered by the mesh openings in bags 11 and 12 so that the flow rate of powder is sufficient and yet not excessive. The mesh bags 11 and 12 also greatly reduce the susceptibility of the dust bag to wind whipping due to the essentially one piece construction and the absence of protective flaps and other appendages. The double protection of bags 11 and 12 provides two differently meshed layers that effectively shield the powder from moisture and external forces, and the sturdy inner bag 10 provides ultimate protection for the powder.

The powder flowing from within bag 13 encounters less resistance at each progressive stage as it passes ultimately to the animals. Thus, the powder passing out through cartridge bags 13 and 14 encounters less resistance in passing downwardly through the mesh openings of bag 11 and still less resistance in passing through the larger mesh openings of bag 12. Conversely, moisture encounters progressively greater resistance in entering the bag and must pass upwardly in order to enter bag 11 at all.

FIGS. 6 and 7 illustrate an alternative embodiment of the invention which is for the most part constructed like the dust bag described in connection with FIGS. 1–5. The differences in the second embodiment reside primarily in the hanger assembly and in the load opening. In addition, an alternative type of cartridge bag assembly 34 is shown which may be used interchangeably with the bag assembly 10 described previously.

The bag assembly 34 includes an inner bag 35 which contains the powder insecticide and which is preferably constructed like the bag 13 described in connection with the first embodiment. Bag 35 is contained within a mesh bag 36 of substantially the same size. Bags 35 and 36 are sealed or tied together to close the ends that are initially open for receiving the powder. Bag 35 is initially imperforate to prevent leakage of the powder during shipping. When ready for use, a plurality of punctures 35a are formed in bag 35 by poking a sharp instrument through both bags 35 and 36. When the instrument is removed, the mesh openings in bag 36 (which enlarge to accommodate the instrument) tend to return to their normal size, leaving the punctures 35a in bag 35 for releasing the insecticide.

In the embodiment of FIGS. 6 and 7, the overlapping top portion of the outer bag is permanently secured to the front panel 16 by stitches 38 so that there is no load opening in the top of the bag. Instead, a load opening 39 in the form of a slit extends through the front of the dust bag and is oriented at an inclined angle from vertical. A wire hanger having loops 40 on its ends is secured to the overlapping top portion of the bag. Loops 40 receive the rope 22 which may be attached to a support (not shown) in the manner described in connection with the first embodiment.

As previously suggested, the loading vent or opening 39 is formed through the front portion of the mesh bags 11 and 12 to permit loading and unloading of the cartridge bag assembly that contains the powder insecticide. Opening 39 is preferably oriented at an angle of between 10° and 30° from vertical, with the preferred angle being 20°.

A rectangular fabric strip 42 forms a closure structure for the opening 39, strip 42 is secured to bag 12 at a location to overlap the load opening 39 and at an angle coinciding with that of the load opening. As shown in FIG. 7, strip 42 includes a mesh fabric 43 which is folded over itself and which sandwiches a waterproof canvas fabric 44 between the folded portions. A velcro fastener 45 is secured to the inside surface of strip 42 on the overlapping portion thereof. A mating velcro fastener 46 is secured to a mounting strip 47 which is in turn attached to bag 12. The velcro fasteners 45 and 46 are located so as to cooperate in forming a tight closure for opening 39 when joined together. Strip 47 locates fastener 46 away from the main bag surface, and since strip 42 completely covers fastener 46 when closed, water running down the bag is shed by the waterproof strip 42 and would have to pass within strip 42 and up and over strip 47 in order to reach the velcro fasteners 45 and 46.

It is noted that the upper edge of strip 42 is oriented at an angle of approximately 20° from horizontal and is stitched to the outer bag 12. The left edge of strip 42 is also secured to bag 12 and is oriented at an angle of approximately 70° from horizontal. Water is therefore able to readily run down these inclined edges of the closure strip 42 so as not to leak through the closure and possibly into the dust bag. Since strip 42 overlies the load opening 39 generally from the top, water is not able to come into contact with the velcro fasteners 45 and 46 for possible leakage therethrough.

The embodiment shown in FIGS. 6 and 7 applies the powder insecticide to animals in essentially the same manner as previously described. The mesh bag 36 of the cartridge assembly provides added support for the more vulnerable inner bag 35 and absorbs much of the forces that are applied during use. Bag 36 additionally protects the powder insecticide against moisture, and its mesh openings provide increased control of the amount of powder that is dispensed. If the inner bag 35 should tear or rupture, bag 36 is itself capable of serving as the actual container which holds the insecticide.

The load opening 39 is a direct outside to inside entry for loading of the cartridge assembly into bag 11. When the velcro fasteners 45 and 46 are secured together, they maintain the load opening firmly closed. Since the opening 39 and closure 42 are oriented at a rather sharply inclined angle (approximately 70°) from horizontal, the weight of the dust bag and its contents is not able to pull open the closure, as is the case with closures that are oriented more closely to horizontal.

It is noted that either cartridge bag assembly 10 or 34 may be employed with the dust bag of the first embodiment (FIGS. 1–5) or that of the second embodiment (FIGS. 6–7). When the bag assembly 34 is used, it is contemplated that the mesh bag 36 will be used repeatedly with different plastic bags 35.

Having thus described the invention, we claim:

1. A dust bag arrangement for applying powdered insecticide to animals and adapted to receive a waterproof cartridge containing said insecticide wherein the cartridge may be punctured to permit flow of insecticide, said arrangement comprising:

a first bag adapted to accommodate the flow of insecticide therethrough and having opposed side panels and a bottom portion;

a second bag disposed inside of the first bag and adapted to accommodate the flow of insecticide therethrough, said second bag having opposed side panels located inwardly of the side panels of said first bag and also having a bottom portion located above the bottom portion of said first bag; and a pair of water resilient panels disposed between corresponding side panels of said first and second bags, said water resistant panels having lower edges which are spaced apart to present a space through which insecticide may pass from the bottom portion of said second bag to the bottom portion of said first bag.

2. The invention of claim 1, wherein the bottom portion of said second bag is spaced above the bottom portion of said first bag to present a substantially enclosed chamber beneath said second bag for receiving the insecticide passing through the latter, the lower edges of said water resistant panels being located in said chamber near the bottom portion of said second bag and above the bottom portion of said first bag.

3. The invention of claim 2, wherein said first bag is a woven bag characterized by mesh openings through which insecticide may pass, said first bag further having a plurality of openings formed therein substantially larger in size than the mesh openings of said first bag and located at the lower portion of said chamber.

4. The invention of claim 1, including a load opening presented in said first and second bags for receiving said cartridge, and a closure structure for closing said load opening, said load opening being in the form of a slit through said bags oriented at an inclination of between approximately 10° and 30° from vertical.

5. The invention of claim 4, wherein said closure structure comprises a water resistant fabric strip secured to the exterior surface of said first bag and having means for closing said slit, said fabric strip having an upper edge inclined from horizontal between approximately 10° and 30° and a side edge inclined from vertical between approximately 10° and 30°.

6. A dust bag arrangement for applying powdered insecticide to animals and adapted to receive a waterproof cartridge containing said insecticide wherein the cartridge may be punctured to permit flow of insecticide, said arrangement comprising:

a substantially enclosed bag member adapted to receive the cartridge and to accommodate the flow of insecticide through the bag member for application to animals;

means presenting a load opening through said bag member to accommodate loading of the cartridge therein; and a closure strip overlying said load opening on the exterior surface of said bag member, said strip having an upper edge and a side edge both oriented on an incline offset substantially from horizontal and from vertical, said strip having means forming a seal over said opening with the seal oriented on an incline offset substantially from horizontal and from vertical.

7. A dust bag arrangement for applying powder insecticide to animals, said dust bag arrangement comprising in combination:

a substantially enclosed bag member adapted to accommodate the flow of insecticide therethrough;

a first collapsible cartridge bag for containing the insecticide, said first cartridge bag having a series of openings therein for discharging the insecticide; and a second collapsible cartridge bag closely surrounding said first bag and having a series of openings therein which are offset from the openings of said first bag, said first and second bags being contained within said enclosed bag member whereby insecticide is able to flow through the offset openings in said first and second bags and thence through said enclosed bag member.

8. In a cartridge bag assembly for containing powder insecticide and applying same to animals, the combination of:

a first collapsible cartridge bag containing the powder insecticide and having a series of openings sized to freely pass the insecticide therethrough; and a second collapsible cartridge bag closely containing said first bag in surrounding relation thereto, said second bag having a series of openings offset from the openings of said first bag with the openings of the second bag sized to freely pass the insecticide therethrough.

9. The combination set forth in claim 8, including a substantially imperforate third bag containing said second cartridge bag to prevent leakage of insecticide during shipping.

* * * * *